United States Patent
Satheesh

(10) Patent No.: US 11,240,552 B2
(45) Date of Patent: Feb. 1, 2022

(54) MULTI-STREAM PLACESHIFTING

(71) Applicant: SLING MEDIA PVT LTD, Bangalore (IN)

(72) Inventor: Sharath Harlharpur Satheesh, Bangalore (IN)

(73) Assignee: SLING MEDIA PVT LTD, Bangalore (IN)

( * ) Notice: Subject to any disclaimer, the term of this patent is extended or adjusted under 35 U.S.C. 154(b) by 220 days.

(21) Appl. No.: 15/722,990

(22) Filed: Oct. 2, 2017

(65) Prior Publication Data

US 2018/0027280 A1 Jan. 25, 2018

Related U.S. Application Data

(63) Continuation of application No. 12/950,792, filed as application No. PCT/IN2011/000275 on Apr. 26, 2011, now Pat. No. 9,788,046.

(51) Int. Cl.
*H04N 21/431* (2011.01)
*H04N 21/4402* (2011.01)
(Continued)

(52) U.S. Cl.
CPC . *H04N 21/4312* (2013.01); *H04N 21/440218* (2013.01); *H04N 21/4622* (2013.01); *H04N 21/6125* (2013.01); *H04N 21/632* (2013.01)

(58) Field of Classification Search
CPC ......... H04N 21/47217; H04N 21/2387; H04N 21/2187; H04N 2201/325; H04N 21/2143;
(Continued)

(56) References Cited

U.S. PATENT DOCUMENTS 6,510,553 B1 1/2003 Hazra
6,784,945 B2 * 8/2004 Norsworthy ............. H04N 5/45
348/564

(Continued)

FOREIGN PATENT DOCUMENTS

EP 2182723 A2 5/2010

OTHER PUBLICATIONS

How to Watch Slingbox on Multiple TVs/Different Programs, Slingbox Answers Forum, May 17, 2010, XP000002658056; retrieved from the Internet: URL:http://answers.slingbox.com/thread/1983?decorator=printed&displayFullThreal-true.

(Continued)

*Primary Examiner* — Ngoc K Vu
(74) *Attorney, Agent, or Firm* — Lorenz & Kopf, LLP

(57) ABSTRACT

Disclosure is directed to managing more than one placeshifting transmission at a target device. The target device may be configured to receive a first video from a first placeshifting source and a second video from a second placeshifting source. The target device may additionally be configured to simultaneously output the first and second video on an output device, using various display screen configurations such as picture-in-picture, split screen, windows, and so. The first and second placeshifting sources may be content receivers having integrated placeshifting functions or may be content receivers provided in association with stand-alone placeshifting devices. A dual-tuner content receiver may also provide both the first and second placeshifting sources to the target device.

18 Claims, 5 Drawing Sheets

(51) Int. Cl.
*H04N 21/462* (2011.01)
*H04N 21/61* (2011.01)
*H04N 21/63* (2011.01)

(58) Field of Classification Search
CPC ..... H04N 21/234363; H04N 21/47202; H04N 21/6587; H04N 21/4312; H04N 21/440218; H04N 21/4622; H04N 21/6125; H04N 21/632; H04N 5/765; H04L 65/1069
See application file for complete search history.

(56) References Cited

U.S. PATENT DOCUMENTS

| | | | | |
|---|---|---|---|---|
| 8,566,469 | B2* | 10/2013 | Jutzi | H04L 29/06027 |
| | | | | 709/231 |
| 9,021,542 | B2* | 4/2015 | Picucci | H04N 21/44204 |
| | | | | 725/134 |
| 9,788,046 | B2* | 10/2017 | Satheesh | H04N 21/4312 |
| 2002/0056088 | A1 | 5/2002 | Silva, Jr. et al. | |
| 2002/0091866 | A1 | 7/2002 | Perlman | |
| 2002/0174444 | A1 | 11/2002 | Gatto et al. | |
| 2003/0196211 | A1 | 10/2003 | Chan | |
| 2005/0044570 | A1* | 2/2005 | Poslinski | H04N 5/4401 |
| | | | | 725/48 |
| 2007/0211174 | A1* | 9/2007 | Putterman | H04N 5/44591 |
| | | | | 348/588 |
| 2007/0242160 | A1* | 10/2007 | Garg | H04N 5/04 |
| | | | | 348/565 |
| 2008/0129864 | A1* | 6/2008 | Stone | H04N 21/43615 |
| | | | | 348/468 |
| 2008/0155591 | A1* | 6/2008 | Mahajan | G06Q 30/02 |
| | | | | 725/34 |
| 2008/0172693 | A1* | 7/2008 | Ludvig | H04N 5/44591 |
| | | | | 725/40 |
| 2008/0263621 | A1 | 10/2008 | Austerlitz et al. | |
| 2009/0157697 | A1* | 6/2009 | Conway | G11B 27/00 |
| 2010/0146527 | A1* | 6/2010 | Craib | H04N 7/17318 |
| | | | | 725/5 |
| 2010/0319038 | A1* | 12/2010 | Devassykutty | H04N 21/4788 |
| | | | | 725/82 |
| 2011/0004894 | A1* | 1/2011 | Newberry | H04N 7/18 |
| | | | | 725/25 |
| 2012/0047532 | A1 | 2/2012 | Mccarthy, III | |

OTHER PUBLICATIONS

Simultaneously Running Two Slingbox on the Same Network, Slingbox Answers Forum, Nov. 4, 2010, XP000002658055; retrieved from the Internet: URL:http://answers.slingbox.com/thread/5419?decorator=print&displayFullThread-true.

European Patent Office|International Search Report and Written Opinion|dated Sep. 14, 2011 for International Appln. No. PCT/IN2011/000275, filed Apr. 26, 2011.

* cited by examiner

MULTI-STREAM PLACESHIFTING

CROSS-REFERENCE TO RELATED APPLICATIONS

This application claims priority to U.S. patent application Ser. No. 12/950,792, filed Nov. 19, 2010 which issued as U.S. Pat. No. 9,788,046 B2, the contents of which are hereby incorporated by reference.

TECHNICAL FIELD

Embodiments discussed herein are directed to managing more than one placeshifting transmission at a target device.

BACKGROUND

Placeshifting technology is generally available today that allows a user to view content on a target device that would otherwise only be available on a receiver. Through placeshifting technology that is integrated into the receiver or is implement in a stand-alone device, a receiver is able shift content across a network to be viewed on a target device that is located remotely from the receiver. The shifted content may include programs or other content that is received at the receiver from a service provider, such as a satellite or cable television provider. The receiver may also shift recorded programs across the network to be viewed at the target device.

SUMMARY

Embodiments discussed herein are directed to managing more than one placeshifting transmission at a target device. The target device may be configured to receive a first video from a first placeshifting source and a second video from a second placeshifting source. The target device may be configured to simultaneously output the first and second video on an output device, using various display screen configurations such as picture-in-picture, split screen, windows, and so. The first and second placeshifting sources may be content receivers having integrated placeshifting functions or may be content receivers provided in association with stand-alone placeshifting devices. A dual-tuner content receiver may also provide both the first and second placeshifting sources to the target device. One embodiment is directed to a placeshifting method, comprising: receiving a first input stream at a placeshifting client from a first placeshifting source, wherein the first input stream is sent across a network from the first placeshifting source to the placeshifting client; receiving a second input stream at the place shifting client from a second placeshifting source, wherein the first input stream is sent across the network from the second placeshifting source to the placeshifting client; and outputting a video signal by the placeshifting client for display on a display device, the video signal comprising a first video from the first placeshifting source and a second video from the second placeshifting source. Another embodiment is directed to a target device in a placeshifting system, the target device comprising: a network connection; a processor connected to the network connection and configured to send and receive transactions across a network through the network connection; a first process configured to execute on the processor, the first process configured to process a first input stream received from across a network from a first placeshifting source; a second process configured to execute on the processor, the second process configured to process a second input stream received from across the network from a second placeshifting source; and an output device connected to the processor and configured to receive content output from the first and second process, the output device configured simultaneously display the first and second video.

Yet another embodiment is directed to a placeshifting system, comprising: a first placeshifting source configured to output a first video stream across a network; a second placeshifting source configured to output a second video stream across the network; and a target device in communication with the first and second placeshifting sources across the network, the target device configured to receive simultaneously display video from the first placeshifting source and video from the second placeshifting source.

DETAILED DESCRIPTION

Figure 1:
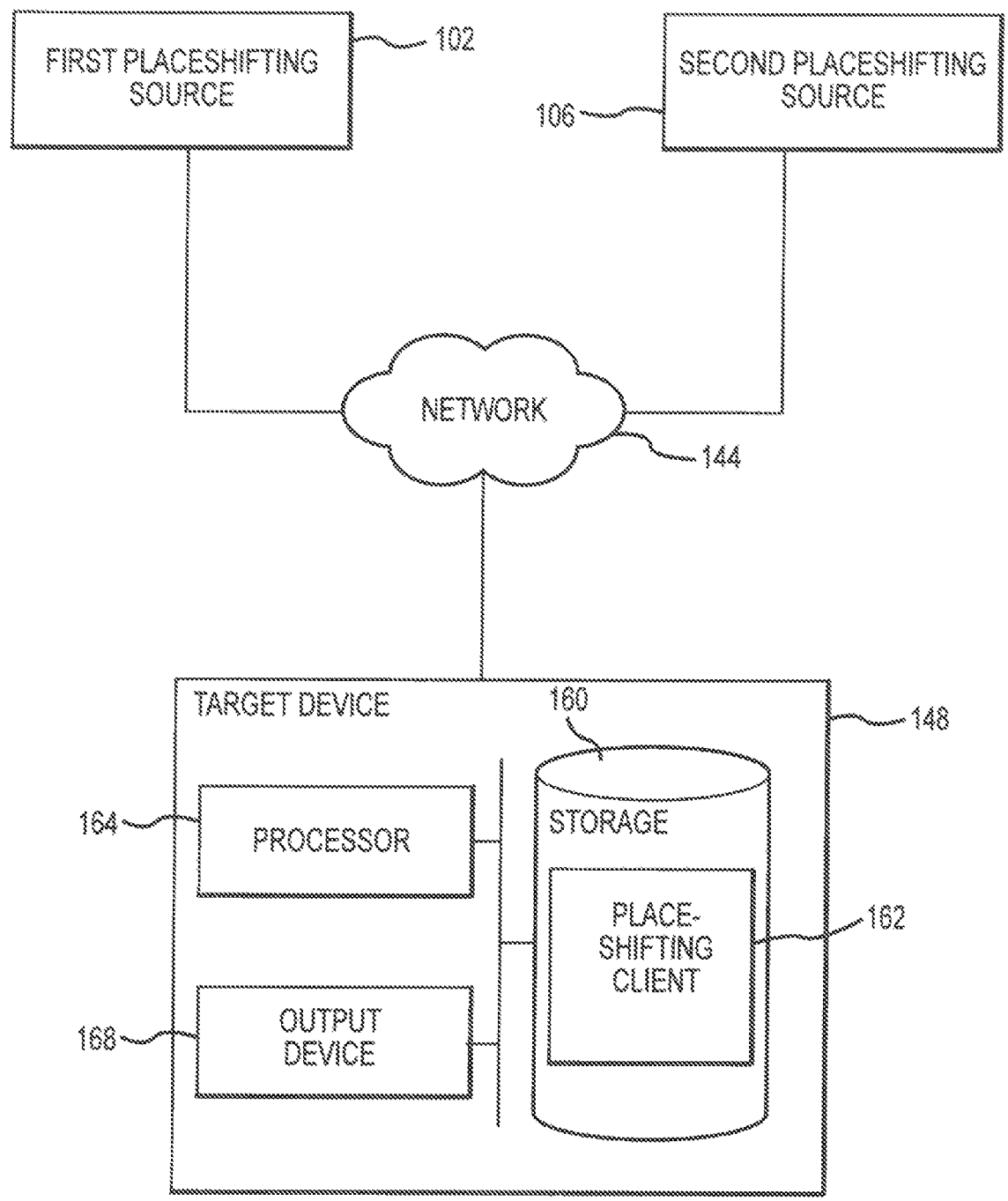
FIG. 1 is a schematic diagram showing a sample system, components and implementations discussed herein.

FIG. 1 is a schematic illustration of a general operating environment showing components and features of embodiments discussed herein. Generally, embodiments discussed herein are directed to receiving and displaying content from multiple placeshifting sources at a target device. In FIG. 1, a target device 148 is configured to receive content across a network 144 from a first placeshifting source 102 and from a second placeshifting source 106. As used herein, "placeshifting" refers to an action of a placeshifting source 102, 106 that transfers content which would otherwise be viewed locally at the placeshifting source 102, 106 across the network 144 to be viewed at the target device 148. Example placeshifting sources are described in connection with FIGS. 2A-2C. Following the description of the example placeshifting sources, the operation of the target device 148 is described.

Figure 2A:
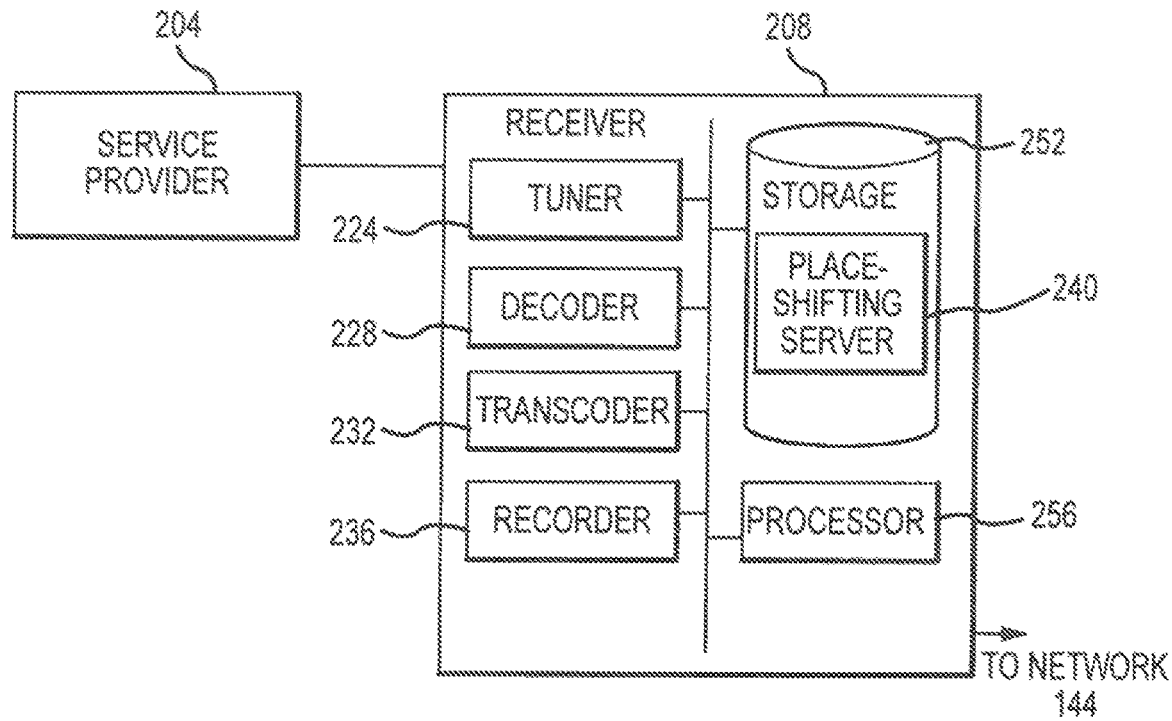
FIG. 2A is a schematic diagram of a content receiver that may serve as the first or second placeshifting source illustrated in FIG. 1.

FIG. 2A is an illustration of a content receiver 208 that may serve as either the first placeshifting source 102 or the second placeshifting source 106. The receiver 208 depicted in FIG. 2A may be configured to communicate with or receive signals from a service provider 204 that broadcast, transmits, or otherwise delivers a content service to a receiver 208. The receiver 208 can include a set-top box (STB), a digital video recorder (DVR), a cable receiver, a general purpose computing device, and so on. The receiver 208 may also include a cable modem that receives streaming video and/or audio. Generally, a "receiver" may be any device capable of receiving video and/or audio content included in a broadcast or other content service transmission from a service provider 204.

The receiver 208 and/or the target device 148 may be associated with an individual, business or other entity, user or subscriber that receives a content service transmission from the service provider 204. Generally the terms "user" and/or "subscriber" refer to an individual or company who receives a content service transmission. This may include those who have purchased a subscription to the content service transmission. Alternatively or additionally, the terms "user" and/or "subscriber" may refer to individuals who have been given access to the content service transmission through promotional offers and/or other non-fee-based agreements.

As used herein, a "service provider" may include any service that provides a content transmission to a receiver 208 such as, without limitation, a satellite television service, a direct television service or a cable television service, or a streaming video delivered across a network such as the Internet. Accordingly, a "content service transmission" encompasses transmission of information across a cable network (for example a cable headend to cable receiver), an Internet or other computer-accessible medium (including a local area network, wide-area network, and so on), including Internet protocol television transmissions, a wireless network such as a radio frequency or infrared network, and so on.

In connection with embodiments that operate in the context of a satellite television service, the service provider 204 may provide a content service transmission through an uplink center. Such a satellite television service may utilize a direct broadcast satellite (DBS) system, which can incorporate packetized transmission signals according to an appropriate standard, such as the MPEG-2 and/or MPEG-4 standards. The uplink center may include a transmitter or other equipment operable to transmit a modulated signal having data representing audio and/or visual content. The modulated signal may be received at a satellite, which in turn retransmits the modulated signal to be received at one or more terrestrial locations. The retransmitted signal may be received from the satellite at one or more satellite dishes, which are typically associated with one or more receivers 208. In connection with embodiments that operate in the context of a cable television service, the service provider 204 may provide a content service transmission to a headend, which, in turn, delivers the content service transmission to the receiver 208.

The receiver 208 may include a tuner 224 operable to receive the content service transmission signal from the service provider 204 and a decoder 228 to decode the received signal. The decoder 228 may be programmed to decrypt, demodulate, demultiplex or otherwise decode some or all of the received signals in accordance with purchases and selections made by a user. Output from the decoder 228 may be directed to an audio visual (A/V) processing module or other signal output portion, which may process the video and audio streams using digital-to-analog conversion techniques, or compressed digital to uncompressed digital conversion techniques, to produce one or more output signals. The output signals may be sent to a display device, such as a television or monitor in order to display content to a user. In some embodiments, this output signal itself may be place shifted to a target device 148.

The receiver 208 may include or be associated with a recorder 236, such as a digital video recorder (DVR). The recorder 236 may be integrated into the receiver 208 or may be a stand alone device. The recorder 236 may be operated by a user who programs the device or receiver function to record a particular program at a specified time. When the program occurs, the recorder 236 will record and store the program, which can then be viewed later. In addition to this functionality, the recorder 236 may buffer a certain amount of content during a live transmission. Buffering a live transmission allows a user to pause and/or rewind the content of the transmission and to then display the content in a non-live or delayed manner. When the user programs the recorder 236 to record a particular program, he or she may additionally specify that the recording should be listed on one or more user recording lists.

The receiver 208 may include or be associated with a memory or other storage device 252, such as magnetic or optical storage. The storage device 252 may be operable to store data received from the decoded content transmission signal. The storage device 252 may be volatile or nonvolatile memory implemented using any suitable technique or technology such as, for example, random access memory (RAM), disk storage, flash memory, solid state and so on. The storage device 252 may be located within the receiver 208 or separately from the receiver 208. The storage device 252 may be removable in nature. The stored data set may include audio and/or visual content to be transmitted and output through a display device, such as a television or monitor. Generally, audio/visual content may include still images, video images, animation and/or audio. Portable Network Graphics (PNG) or other appropriate formats, such as for example, Tagged Image File Format (TIFF), Joint Photographic Experts Group (JPEG), Motion Picture Experts Group (MPEG)-2, MPEG-4 may be used to display an image or video.

The receiver 208 may additionally include a processor 256 operable to run executable code in connection with various functions associated with the receiver 208. For example, the processor 256 may display graphics, images, animations or other content through an output device, such as a television or monitor. The storage device 252 may store an application, file, or other data that is useable by the processor 256. As used herein, an application includes processor executable code that may be run to carry out one or more functions associated with the receiver 208. "Processor executable code" includes any computer-readable media or commands that may be ultimately interpreted by a processor, such as HTML or XML files that are rendered into user-viewable applications by an application executed by the processor 256.

The storage device 252 may include a placeshifting server 240, which may be configured to be executed by the processor 256. Generally, the placeshifting server 240 may be operable to transfer content across a network 144 to the target device 248. Network transactions may be conducted through the operation of a network interface, such as a modem network interface card, cable plug or jack, and so on. Using the interface, the placeshifting server 240 may communicate over a network 144, such as packet switched network or a circuit switched network, such as the public switched telephone network (PSTN). It should be appreciated that the network 144 may be any type of network capable of data communication, such as, for example, a local or wide area network or the Internet. The receiver 208 may communicate through a network connection using any suitable communication protocol such as TCP/IP.

The placeshifting server 240 may transfer audio/visual programs or other content, such broadcast programs received by the receiver 208 from the service provider 204.

The placeshifting server 240 may be associated with a transcoder module 232. Generally, the transcoder module 232 is operable to convert data representing the audio/visual content from one transmission format to another. For example, the receiver 208 may receive a program from the service provider 204 in a satellite television format and the transcoder 232 may convert from that format to a format appropriate for transmission across the network 244. The placeshifting server 240 may transfer recordings stored locally at the receiver 208 by the recorder 236.

Figure 2B:
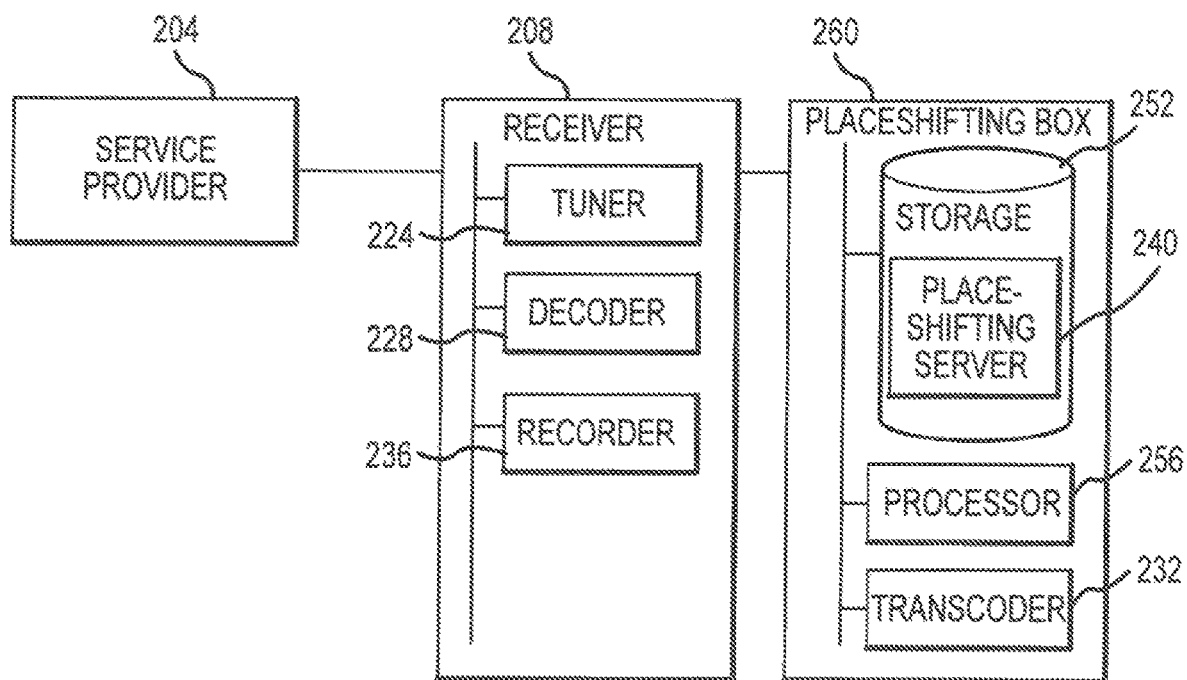
FIG. 2B is a schematic diagram of another content receiver that may serve as the first or second placeshifting source illustrated in FIG. 1.

The receiver 108 shown in FIG. 2A includes an integrated placeshifting server 240 and trans-coder 232. In other embodiments, such as shown in FIG. 2B, a receiver 208 may be connected to a separate, stand-alone box or device 252 that includes a placeshifting server 240 and a trans-coder 232. The receiver 208 shown in FIG. 2B may serve as either the first placeshifting source 102 or the second placeshifting source 106. The stand-alone device 252 may receive a decoded signal from the receiver 208 through an S-video connection, HDMI connection, or other appropriate connection. The stand-alone device 252 may also be connected to the network 144 such that the placeshifting server 240 associated with the stand-alone device 252 may deliver placeshifted content to a remote network end point. A placeshifting server 240 may be provided through a stand-alone device 252 to provide placeshifting functionality to a user without forcing the user to replace her existing receiver with a receiver having an integrated placeshifting functionality.

Figure 2C:
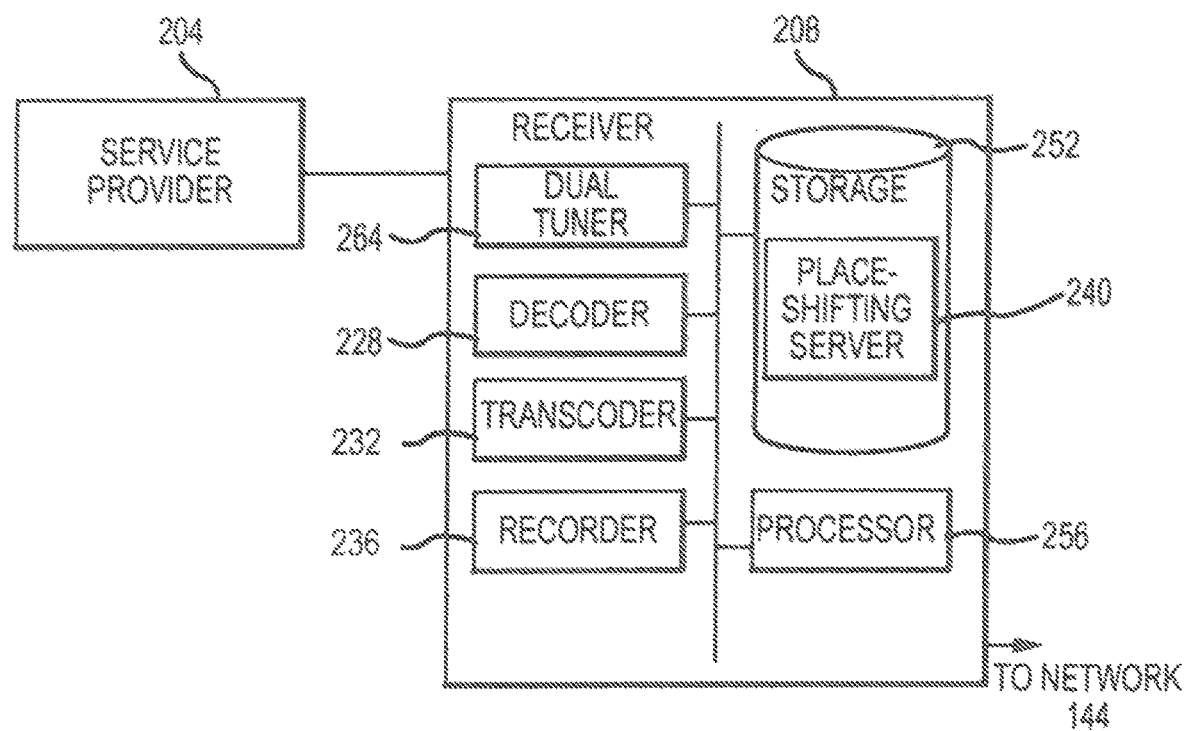
FIG. 2C is a schematic diagram of a content receiver that may serve as the first and second placeshifting source illustrated in FIG. 1.

FIG. 2C is an illustration of a receiver 208 having a dual tuner 264. The dual-tuner 264 may be configured to receive two separate channels of content from the service provider 204. The receiver 208 having the dual tuner 264 may be configured to output one channel as the first place shifting source 102 and the second channel as the second placeshifting source 106. In this way, both the first placeshifting source 102 and the second placeshifting source 106 may originate from the same receiver 108. Specifically, the receiver 208 may include one or more decoders 228 that are operable to decode two separate content channels at the same time. The placeshifting server 240 may then output the two channels in parallel network transactions to the target device 148. The placeshifting server 240 may also be configured to output a recorded video and a one decoded channel in parallel network transactions to the target device 148.

When incorporated in any of the example systems shown in FIGS. 2A-2C, the placeshifting server 240 communicates with a target device 148 to shift display of content from the receiver 208 to the target device 148. The placeshifting server 240 may shift display of content to the target device 148 in order to allow a user to view and/or hear content at a location that is remote from the location of the receiver 208. In one instance, the target device 148 may be a mobile device that the user carries from place to place, such as a cellular phone, smart phone, personal digital assistant, laptop computer, and so on. Here, the placeshifting server 240 may make content, which is otherwise only available to the user at the receiver 208, available to the user while the user is mobile. The target device 148 may also be stationary device, such as a desktop computer. Here, the placeshifting server 240 may make content, which is otherwise only available to the user at the receiver 208, available to the user while the user is accessing a secondary device, such as a work-computer.

Generally, the target device 148 may include a processor 164, operable to load and store various processor-executable modules stored in the storage device 160. The target device 148 may additionally include an output device 168, such as an LED or LCD screen. The storage device 160 associated with the target device 148 may include a placeshifting client 162. The placeshifting client 162 may be configured to receive multiple input stream associated with one or more placeshifting servers 240 associated with one or more placeshifting sources 102, 106. The processor 164 may include multithreaded or parallel processing functionality in order handle input from both the first placeshifting source 102 and the second placeshifting source 106. The placeshifting client 162 may receive the placeshifting transmissions or other communications from the placeshifting sources 102, 106. When the placeshifting transmission is received, the placeshifting client 162 may output the received audio/visual content to the output device 168.

The target device 148 may connect to the network 144 through a router or gateway, which provides a communication pathway between network end-points on a local network, and provides a communication pathway for the network end-points to reach globally addressable end-points on a larger network 144, such as the Internet. The router or gateway may be associated with a local area network (LAN), wide area network (WAN), W-Fi network, and so on. The router or gateway may determine the IP address or other network address used by the target device to connect to the network 144. The target device 148 may additionally have other local-network-specific details or parameters that are used to connect with the target device 148 when it sits on the local network. Such network-specific parameters may include connection mechanisms, network passwords, and so on.

Figure 3A:
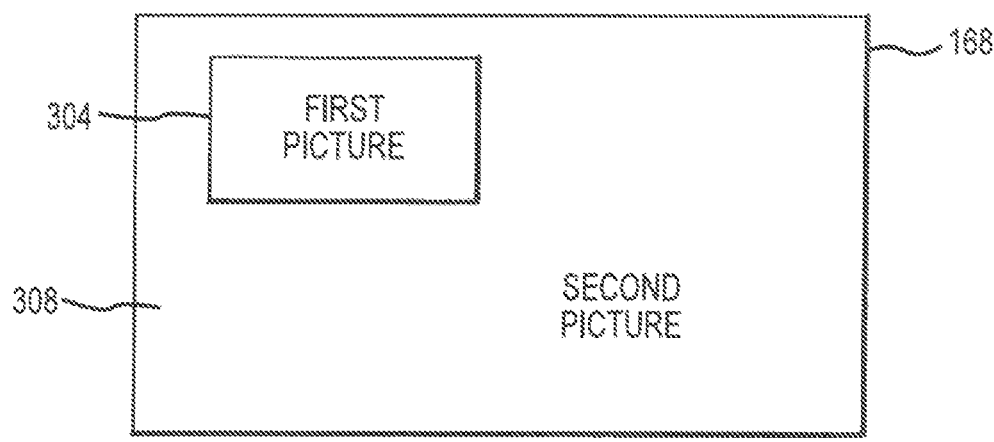
FIG. 3A is an illustration of a picture-in-picture output from the display device shown in FIG. 1.

The place-shifting client 162 may combine video from the first place-shifting source 102 with video from the second place-shifting source 106 and output the combination to be displayed on the output device 168. The place-shifting client 162 may arrange the combined video in various orientations on the output device 168. In one embodiment, the place-shifting client 162 may output a picture-in-picture display, such as the one shown in FIG. 3A. The output from output device 168 shown in FIG. 3A includes a first picture 304 which is overlain on top of a second picture 308. The first picture 304 may be from a first place-shifting source 102 and the second picture 308 may be from the second place-shifting source 106. In connection with the picture-in-picture display shown in FIG. 3A, the target device 148 may also output an audio stream corresponding to one of the pictures displayed on the output device 168. In one embodiment, the output audio corresponds to the larger picture, in this case the second picture 308. In the picture-in-picture display shown in FIG. 3A, the first picture 304 obscures a portion of the second picture 308. The user may in one embodiment switch the position of the first picture 304 and the second pictures 308, by pressing a "swap" or other picture-in-picture function button on a remote control or other user input device.

Figure 3B:
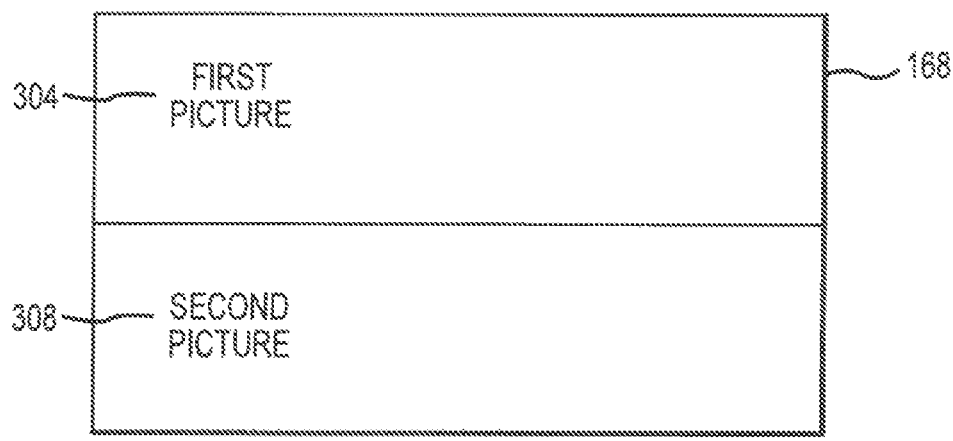
FIG. 3B is an illustration of a split screen output from the display device shown in FIG. 1.

In another embodiment, the place-shifting client 162 may display the first picture 304 and the second picture 308 in a split screen such as shown in FIG. 3B. Here, the first picture 304 may be located on an upper half of the output device screen 168, and the second picture 308 may be located on a lower half of the output device 168. In the orientation shown in FIG. 3B neither the first picture or second picture is obscured by the other. Other screen configurations may utilized. For example, the first picture 304 may be located on a left half of the output device screen 168, and the second picture 308 may be located on a right half of the output device 168.

Figure 3C:
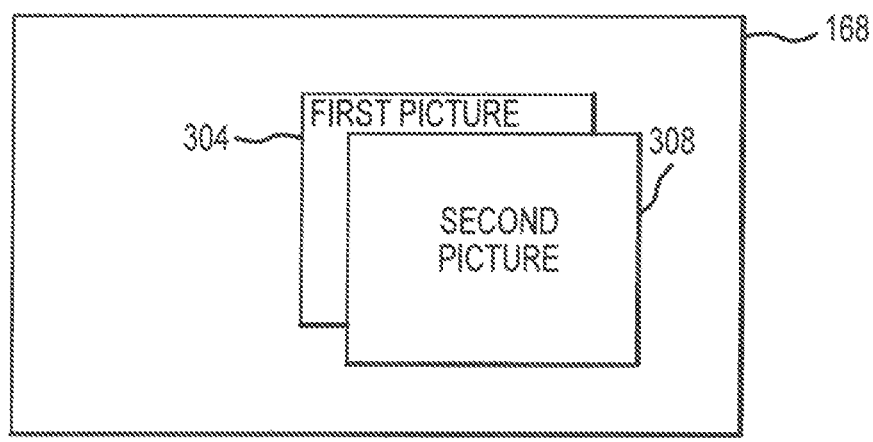
FIG. 3C an illustration of a windows-type output from the display device shown in FIG. 1.

In another embodiment, the place-shifting client 168 may utilize a "windows" format such that the first picture 304 and the second picture 308 are each displayed in a window as shown in FIG. 3C. In this embodiment, the windows that contain the first picture 304 and the second picture 308 may be resizable and movable to different locations on the surface of the output device 168. As shown in FIG. 3C the second picture 308 is output through a window which is currently overlain on top of the window which displays the second picture 304.

Receiving content from two placeshifting sources is used herein by way of example and not limitation. The multistream placeshifting concepts discussed herein can be extended to include at target device 168 that is configured to receive an arbitrary number ("N") of videos and/or audios from N number of placeshifting sources. These N videos may be displayed in any of the screen sharing formats described above. Additionally, a target device 168 configured to receive N placeshifted videos may output the videos in a "tile" format of N videos arranged in a grid on the screen.

Figure 4:
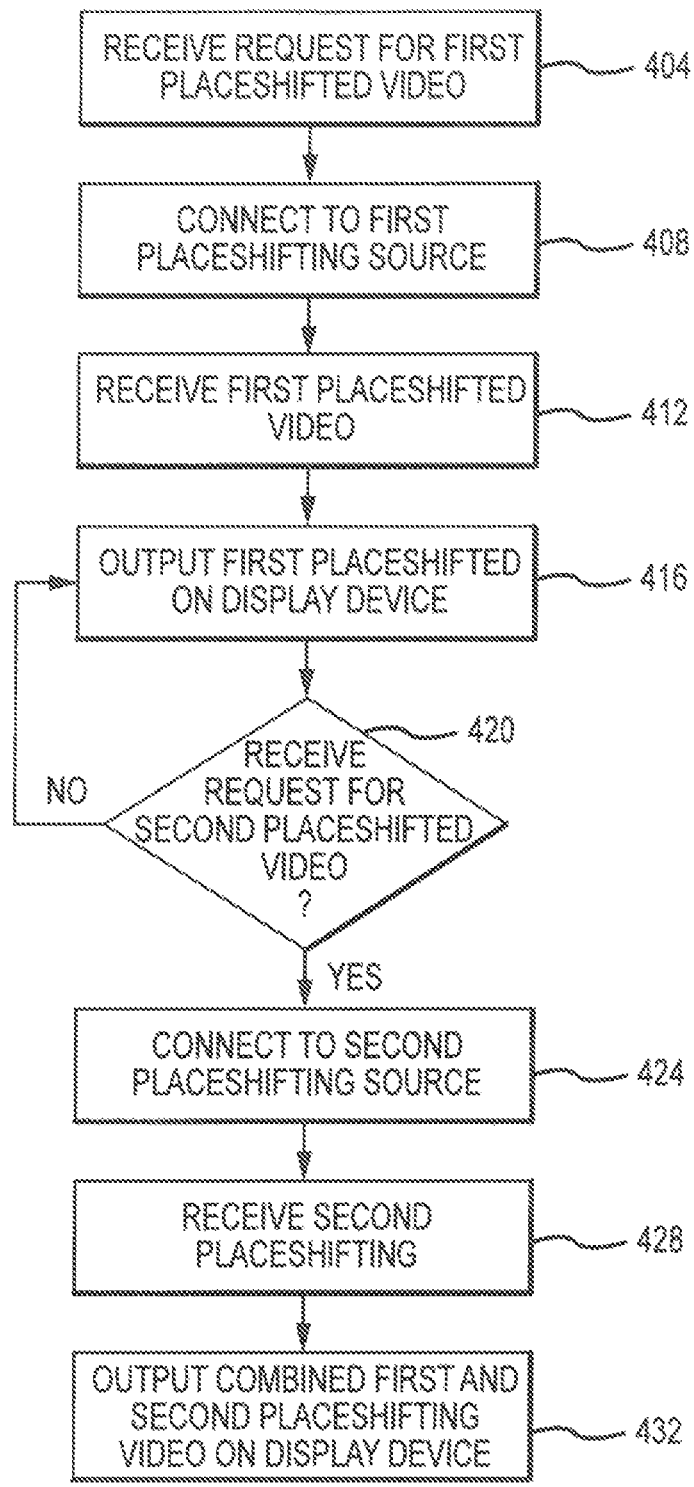
FIG. 4 is a flow chart that illustrates a placeshifting method in accordance with embodiments discussed herein.

FIG. 4 is a flowchart that illustrates a multi-stream placeshifting method in accordance with embodiments discussed herein. Initially, in operation 404, the target device 148 receives a request for a place-shifted video. A user may input the place-shifting request, for example, by entering an appropriate command through a keypad or other user input device. In so doing, the user may select a video that is available at a first place-shifting source 102. Following operation 404, operation 408 may be executed.

In operation 408, the place-shifting client 162 may connect to the first place-shifting source 108. Connecting to the first place-shifting source may include initiating a network transaction across the network 144 from the target device 148 to the place-shifting source 102. Following operation 408, operation 412 may be executed.

In operation 412, the place-shifting client receives a first place-shifted video. Operation 412 may include the first place-shifting source receiving a broadcast or other transmitted video that is then transcoded by the first place-shifting source and output in a network transaction across the network 144 to be received by the place-shifting client 162. Following operation 412, operation 416 may be executed.

In operation 416, the place-shifting client 162 may output the first place-shifted video on the display device 168. At this point, the output device 168 displays one video. Accordingly, the one video may occupy the entire area of the output device 168. Following operation 416, operation 420 may be executed.

In operation 420, a determination may be made as to whether the target device 148 receives a request for a second place-shifted video. As described above, the request for a place-shifted video may be received in connection with a user who inputs the request through a keyboard or other user input device. If, in operation 420, no request for a second place-shifted video is received, operation 416 may be again executed, such that the video from the first place-shifting source is continually displayed on the display device 168. If, in operation 420, a request for a second video is received, operation 424 may be executed.

In operation 424, the place-shifting client 162 may connect to the second place-shifting source 106. Connecting to the second place-shifting source may include initiating a network transaction or connection across the network 144 from the target device 148 to the place-shifting source 106. The first and second place-shifting sources 102, 106 may be separate devices that are located in different geographic locations. In one embodiment, the first or second placeshifting source may be a stand-alone place-shifting box. In another embodiment, the first and second place-shifting sources 102, 106 may originate from one receiver 108 that includes a dual tuner 264. Following operation 424, operation 428 may be executed.

In operation 428, the place-shifting client 162 receives the second place-shifted video. Operation 428 may include the second place-shifting source receiving a broadcasted or otherwise transmitted video from a service provider 204 and transcoding the video to be sent across the network 144 to the target device 148. In other embodiments, the second place-shifted video may be a video recorded or otherwise stored at the second place-shifting source 106. Following operation 428, operation 432 may be executed.

In operation 432 the target device 148 may combine the first and second place-shifted videos and output the combined video to the output device 168. The first and second place-shifted videos may be displayed in various orientations, such as a picture-in-picture display, a split-screen display, and so on. In other embodiments the first and second place-shifted video may be each displayed in a different window that may be displaced or resized on the output device 168.

By way of example and not limitation, some system elements described herein such as the placeshifting servers 240 and the placeshifting client 162 are depicted in the figures as processor executable software or code elements that are stored in a stored in a storage device 160, 252. However, it should be appreciated that some system designs consistent with the teachings described herein may implement separate modules within a receiver or target device that serve the placeshifting functions implemented by the illustrated placeshifting server 240 and placeshifting client 162. Such modules may include hardware and/or software elements that are implemented apart from the storage devices 160, 252. In some embodiments, such separate modules may utilize the storage devices 160, 252 for such purposes as loading and/or storing data.

While embodiments are discussed herein in connection with a exemplary satellite or cable broadcast system, it should be appreciated that embodiments may be used in connection other types of networks or content delivery mechanisms. Generally, the disclosure includes content delivered from a provider to a receiver across or over a network. The network across which content may be delivered may include satellite or cable system. Alternatively, the network may include a local area network, wide area network or the Internet. In connection with certain embodiments, a receiver may include a general purpose computer operable to receive data or other content across a network, such as a wide area network of the internet. In such embodiments, the computer may be configured so that a provider can access a web site, a file transfer protocol (FTP) site, a file sharing system or site, and so on. Moreover, the order of method operations, such those shown in FIG. 4, described herein is by way of example and limitation. Certain implementations may reorder method operations without departing from the spirit and scope of the disclosure.

The invention claimed is:

1. A placeshifting method for a target device, the method comprising:

receiving multiple input streams at a single placeshifting client hosted by the target device in communication with a transcoder coupled to a dual-tuner of a television receiver, wherein the dual-tuner is configured to receive two separate channels of content from a service provider of the multiple input streams comprising a first input stream and a second input stream wherein the first input stream includes a first television program received at the dual-tuner for the target device and wherein the first input stream is sent across a packet-switched network to the target device, wherein the transcoder is operable to convert data representing the first television program to a format appropriate for transmission across the packet-switched network;

in response to a request for the second input stream while the first input stream is received from the dual-tuner of the television receiver, receiving, by the dual-tuner of the television receiver, a second channel separate from the first channel comprising a second television program, wherein the transcoder coupled to the dual-tuner is operable to convert data representing the second television program to the format appropriate for transmission across the packet-switched network, and is coupled remotely to the single placeshifting client via the packet-switched network;

communicating to the target device, by a placeshifting server coupled to the transcoder and the dual-tuner, shifting of the first and second television programs that are outputted from the transcoder for transmittal over the first and second input streams via the packet-switch network, and for receipt by the single placeshifting client; and in response to receipt of the first and second input streams by the single placeshifting client, outputting a video signal, by the single placeshifting client, for display of content of the first and second television programs on the target device, wherein the content from the video signal is extracted simultaneously from the first input stream for the first television program and the second input stream for the second television program.

2. The placeshifting method of claim 1, wherein the method of outputting a the video signal further comprises:
outputting a picture-in-picture display having a first picture containing the first video and a second picture containing the second video, wherein the first picture is overlaid on the second picture.

3. The placeshifting method of claim 1, wherein the method of outputting the video signal further comprises:
outputting a split screen display having a first picture containing the first video and a second picture containing the second video, wherein the first picture occupies a first half of display device and the second picture occupies a second half of the display device.

4. The placeshifting method of claim 1, wherein the method of outputting the video signal further comprises:
outputting a first window for the first video and a second window for the second video, wherein the first window contains the first video and the second window contains the second window, and at least one of the first and second window may be displaced or resized in response to user input.

5. The placeshifting method of claim 1, wherein the method of outputting the video signal further comprises:
outputting an audio signal, the audio signal corresponding to at least one of the first and second videos.

6. The placeshifting method of claim 1, wherein the dual-tuner of the television receiver receives the second television program from a digital video recorder.

7. A target device in a placeshifting system, the target device comprising:
a network connection configured to communicate over a packet-switched network;
a processor connected to the network connection and configured to send and receive transactions across the packet-switched network through the network connection;
a first process configured to execute on the processor, the first process configured to process a first input stream received across the packet-switched network from a first placeshifting source, wherein the first placeshifting source comprises a transcoder configured with a dual-tuner of a television receiver;
a second process configured to simultaneously execute with the first process on the processor, the second process configured to process a second input stream received across the packet-switched network from a second placeshifting source that is different from the first placeshifting source;
wherein the second placeshifting source comprises the transcoder configured with the dual-tuner of the television receiver, and wherein the second process comprises connecting to the second placeshifting source in response to a request for the second input stream, while receiving the first input stream from a first channel for a first television program, to simultaneously receive a second channel for a second television program by the dual-tuner of the television receiver;
wherein the transcoder configured with the dual-tuner of the television is operable to convert data representing the first and second television programs to a format appropriate for transmission across the packet-switched network;
a placeshifting server coupled to the transcoder and the dual-tuner of the television, to communicate to the target device to shift the first and second television programs that are outputted from the transcoder for transmission over the first and second input streams via the packet-switch network for receipt at a single placeshifting client; and
wherein the single placeshifting client is configured to output a video signal for display of content of the first and second television programs on the target device, wherein the content from the video signal is extracted simultaneously from the first input stream for the first television program, and the second input stream for the second television program.

8. The target device of claim 7, wherein the output device outputs a picture-in-picture display having a first picture containing a first video and a second picture containing the second video, wherein the first picture is overlaid on the second picture.

9. The target device of claim 7, wherein the output device outputs a split screen display having a first picture containing the first video and a second picture containing the second video, wherein the first picture occupies a first half of display device and the second picture occupies a second half of the display device.

10. The target device of claim 7, wherein the output device outputs a first window for the first video and a second window for the second video, wherein the first window contains the first video and the second window contains the second window, and at least one of the first and second window may be displaced or resized in response to user input.

11. The target device of claim 7, wherein the output device outputs an audio signal, the audio signal corresponding to at least one of the first and second videos.

12. A placeshifting system for a target device, comprising:
a first placeshifting source configured to output a first video stream across a packet switched network wherein the first placeshifting source comprises a transcoder coupled to a dual-tuner of a television receiver;
a second placeshifting source configured to output a second video stream across the packet switched network wherein the second placeshifting source comprises the transcoder coupled to the dual-tuner of the television receiver;
the target device in communication with the first and second placeshifting sources across the packet switched network, the target device configured to receive simultaneously the first video stream of the first placeshifting source and the second video stream of the second placeshifting source;
in response to a request for the second video stream while the first video stream is being received by the dual-tuner of the television receiver on a first channel for the first placeshifting source, connecting the dual-tuner of the television receiver to receive the second video stream for the second placeshifting source on a second channel separate from the first channel, wherein the first channel contains a first television program while the second channel contains a second television program;
a placeshifting server coupled to first and second placeshifting sources, to communicate to the target device to shift the first and second television programs that are outputted from the transcoder for transmission over the first and second video streams via the packet-switch network for receipt at a single placeshifting client; and
wherein the single placeshifting client is configured to output a video signal for display of content of the first and second television programs on the target device, wherein the content from the video signal is extracted simultaneously from the first video stream for the first television program, and the second video stream for the second television program.

13. The placeshifting system of claim 12, wherein the first placeshifting source comprises a receiver having an integrated placeshifting function.

14. The placeshifting system of claim 12, wherein the first placeshifting source comprises a receiver provided in association with a stand-alone placeshifting device.

15. The placeshifting system of claim 12, wherein the first placeshifting source and the second placeshifting source originate from a same type of the transcoder and receive output on two separate channels.

16. The placeshifting system of claim 12, wherein the first placeshifting source receives video content from a cable-television service provided.

17. The placeshifting system of claim 12, wherein the first placeshifting source receives video content from a satellite-television service provided.

18. The placeshifting system of claim 12, wherein the first placeshifting source receives video content from a personal video recorder.

* * * * *